United States Patent [19]

Kring et al.

[11] Patent Number: 4,598,598
[45] Date of Patent: Jul. 8, 1986

[54] SERVO DRIVE

[75] Inventors: Werner Kring; Karl Schleifenbaüm, both of Haiger, Fed. Rep. of Germany

[73] Assignee: Siegerland-Bremsen Emde GmbH, Haiger, Fed. Rep. of Germany

[21] Appl. No.: 576,156

[22] Filed: Feb. 2, 1984

[30] Foreign Application Priority Data

Feb. 10, 1983 [DE] Fed. Rep. of Germany ....... 3304487

[51] Int. Cl.4 .................... F16H 27/02; F16H 29/02; F16H 29/20
[52] U.S. Cl. .................................... 74/89.15; 74/89.2; 901/21; 901/28; 901/29
[58] Field of Search ................... 74/89.15, 89.2, 89.21, 74/89.22; 901/21, 28, 29

[56] References Cited

U.S. PATENT DOCUMENTS 2,786,361 3/1957 Russell ............................... 74/89.22
3,614,898 10/1971 Paine ................................. 74/89.15
4,366,722 1/1983 Hasler ................................. 74/89.2

FOREIGN PATENT DOCUMENTS 1133961 3/1963 Fed. Rep. of Germany .

Primary Examiner—Albert J. Makay
Assistant Examiner—David W. Westphal
Attorney, Agent, or Firm—Trexler, Bushnell & Wolters, Ltd.

[57] ABSTRACT

A setting device for the conformal positioning of, for instance, a working member on a robot, has a driving motor and a reduction gearing. The latter consists of at least one spindle drive which moves a steel band or the like which is disposed around the take-off shaft and which is pretensioned against the torque applied by the tensioning means. The pretensioning can be applied by a spindle drive opposingly running in the same direction. Furthermore or alternatively it is possible to apply the pretensioning by spring force which acts on the steel band or steel bands.

7 Claims, 6 Drawing Figures

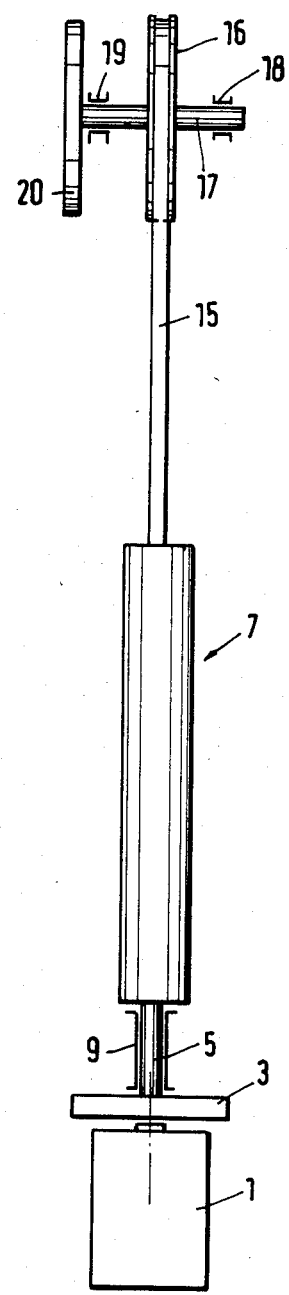
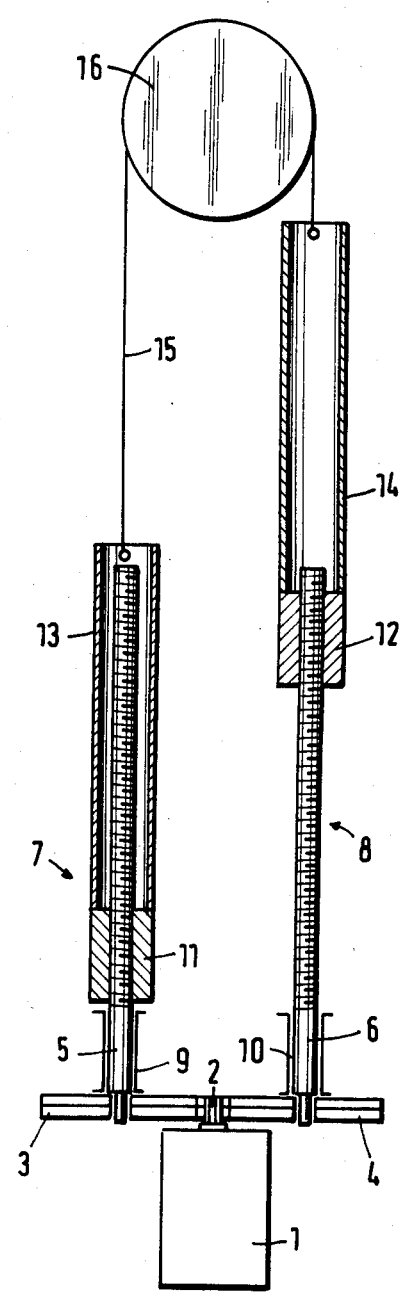

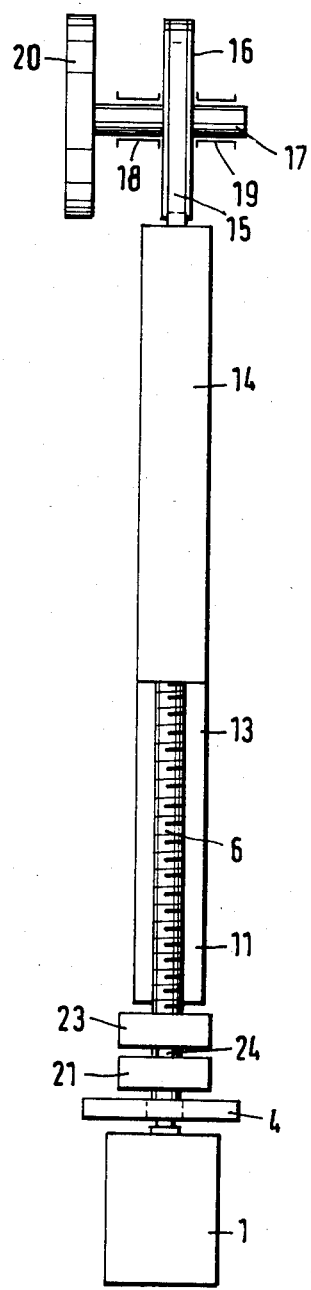
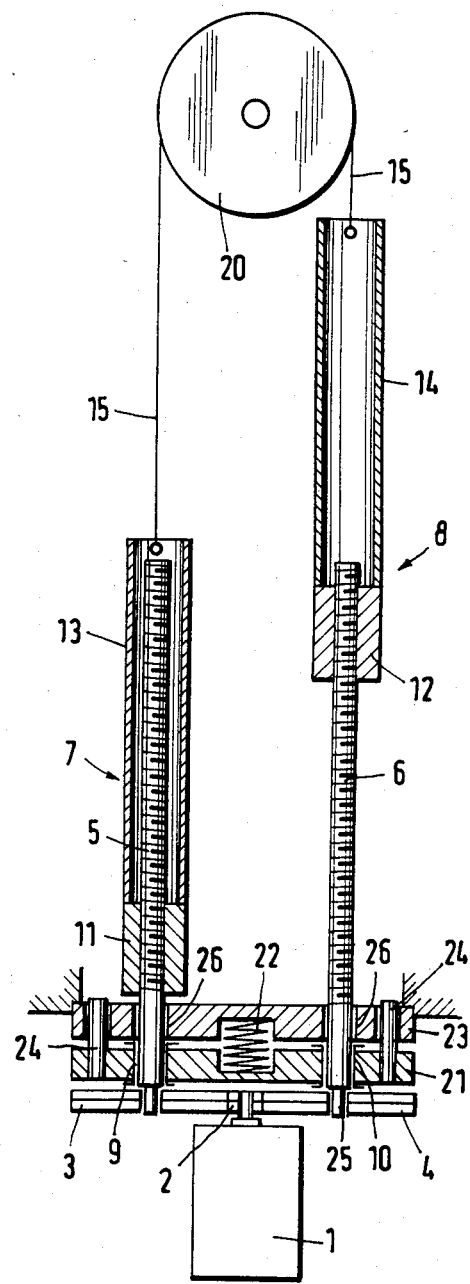

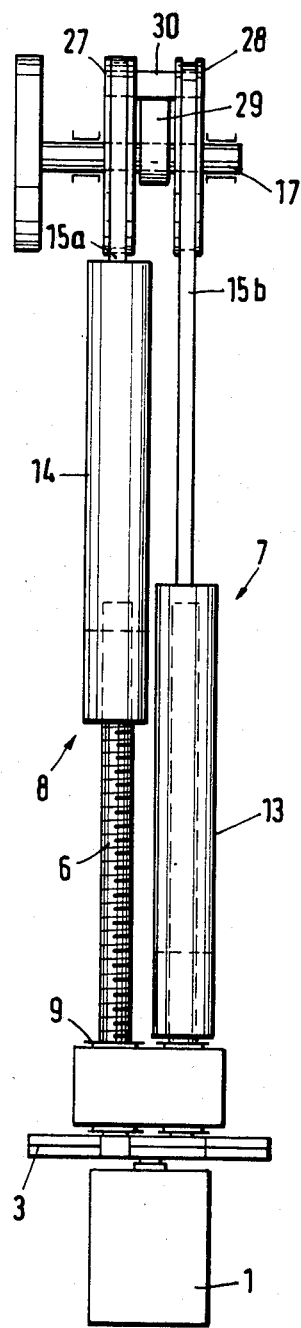
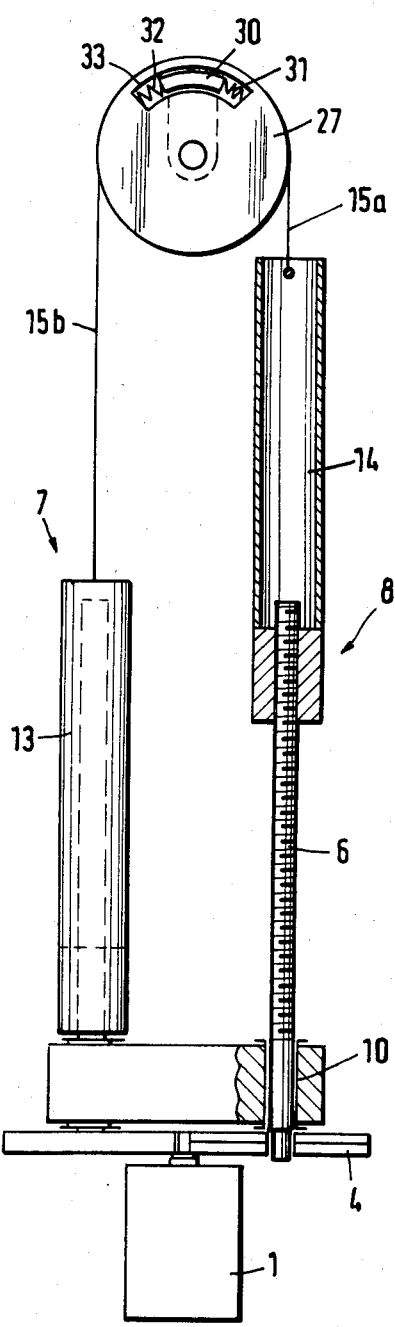

SERVO DRIVE

BACKGROUND OF THE INVENTION

The invention relates to a setting drive or servo drive for the conformal positioning of a take-off shaft. It has a reducing spindle drive, one part of which is axially fixed but turnable and drivable. The other part thereof engages a torsion-resistant and longitudinally movable band or flexible tension member the first mentioned part. One end of the flexible low-expansion tension member is fastened under pretensioning on the longitudinally movable part of the spindle drive and the other end thereof is torsionally connected with the take-off shaft.

Setting drives of this type have many possibilities of use. They serve, for instance for follow-up of readings or for the motion of robot members.

The setting drive mentioned in the beginning is known from U.S. Pat. No. 3,614,898 and consists of a spindle, which on the end side is axially fixed but turnable, and of a nut which is axially movable by rotation of the spindle and on whose axial ends there are fastened bands consisting, for instance, of phosphor bronze.

The other ends of the bands crossing each other are fastened adjustable and therefore pretensionable on the peripheral surface of a curve segment which itself is fastened on the take-off shaft extending vertical to the spindle axis.

As far as the curve segment of this well-known setting drive, as illustrated, is a circle segment, the pretensioning set in a certain initial position and thereby the freedom from play between nut and take-off shaft during the rotation of the spindle (this during the operation of the setting drive) does not remain preserved because the geometric relations change. In order to take this into account, a complicated curve structure would be needed which again makes impossible a motion of the take-off shaft over more than a relatively small angle of traverse.

Above all, however, in connection with the well-known setting drive the pretensioning of the bands relative to the nut does not permit the equalization of play between the spindle and the nut. But the elimination of this play is of decisive importance because it has a considerable influence on the accuracy of the transfer of motion.

OBJECTS AND SUMMARY OF THE INVENTION

The invention is therefore based on the problem to develop a setting drive of the type mentioned in the beginning in such a way that with little structural and operational expense the conformal positioning of the drive shaft is made possible reproduceably without the necessity to make excessively high demands on the precision of the transmission train. Beyond that, there is preferably desired a setting drive whose structural volume is small in the one of the take-off shaft so that the use of narrow places accessible with difficulty is made possible.

As defined in the invention this problem is solved by the fact that the tensioning means extends in the axial direction of the longitudinal motion with the other end thereof being guided force-locking or form-locking around the take-off shaft and in the provision of a device which pretensions drive and take-off against each other. By the pretensioning arrangement any play between drive and take-off is eliminated and the aligned arrangement of the tensioning means relative to the spindle guarantees continuously uniform linear transmission kinematics which makes possible not only the transferring of certain angle positions of the take-off shaft over larger angle zones (up to a full rotation and even beyond) but also increases the constant reproduceability of such control operations. However, the tensioning means shifted merely longitudinally between spindle and take-off shaft can be led easily to relatively remote narrow places, for instance, the members of a robot.

The (rotary) pretensioning of the take-off shaft can take place in various ways. In the most simple case a rotary spring will suffice which produces a sufficiently uniform pretensioning force over the setting range.

However, for the relation of the position of the rotary drive to the position of the take-off shaft (and thereby the reproduceability of the transmission) there is disadvantageous that thermal influences, for instance, an expansion of the tensioning means, change the relation of the rotary drive to the take-off shaft. There is preferably provided, however, that the pretensioning device is a second spindle drive with an advance path the same as the first spindle drive opposingly dircted and that it works on the take-off shaft by means of tensioning means of the same type. Thereby the previously mentioned influences disadvantageous to the certain reproduceability of the controlled positions of the take-off shaft are automatically compensated in a simpler manner.

From West German Pat. No. 11 33 961, it has become known to carry out the swinging motion of a gripping or transfer arm by means of two piston cylinder units operated opposingly which are arranged parallel to each other and are connected by a band going off coaxially each time and guided around the swinging shaft of the arm. However, such a system would be unsuited as a setting drive because the pneumatic drive permits neither the necessary accuracy of transmission nor the required sure reproduceability of the control positions even if it is hydraulically supported in the manner shown there. For this purpose form-locking between drive and take-off is needed which, however, in the state-of-the-art was afflicted with the tolerance problems and space problems described above.

In detail, the arrangement can be made in such a way that a spring pretensions jointly the bearings of the parts of both spindle drives, which per se are placed rotatable and axially immovable. In this case an axial tolerance equalization is required in the drive of both spindles.

Another advantageous form, which does not require this equalization, provides that the tensioning means are fastened on a disk each, which is rotatable on a take-off shaft, and that the disks are supported under pretension on an engaging piece fastened on the take-off shaft opposingly by means of springs. However, both forms of the pretensioning device have in common that during the operation of the setting drive no follow-up adjustments are required.

The tensioning means made usually as a thin flat band especially of steel can wind around the drive shaft singly or several times if there has been assured by suitable measures that the winding around the take-off shaft remains always the same. In connection with the arrangement of two spindle drives, however, two separate steel bands can be provided and be fastened on the take-off shaft; in this case, too, each band can be wound around the take-off shaft partly, singly or even several times.

As a rotary drive there is considered advantageously a pulse step motor which can be digitally controlled. An especially high resolution of the pulse steps results if a similarly reducing back-gearing arrangement is put between the rotary drive and the spindle drive or spindle drives. In connection with the employment of two spindle drives the reduction gear can be a spur gearing with a pinion of the rotary drive driving two equal spur wheels each fastened coaxially on the axially movable part of one of the spindle drives. If the pinion is put between the two spur wheels there prevails again identical relations on both gear trains, however, the spindle drives must be spiralled opposingly.

THE DRAWINGS

The drawings illustrate the invention in several embodiments in a schematic presentation where:

FIGS. 1, 3 and 5 who the setting drive in a partially sectional top view; and

FIGS. 2, 4 and 6 show the setting drive in a lateral view (FIG. 2 in a center section).

DETAILED DESCRIPTION OF THE ILLUSTRATED EMBODIMENT

FIGS. 1 and 2 illustrate a first embodiment.

The motor 1 (rotary drive) drives by means of its pinion 2 equal spur wheels 3 and 4 in the same direction. Spur wheels 3, 4 are fastened on the ends of the spindles 5, 6 of equal but opposingly spiralled spindle drives 7, 8. The spindles 5, 6 are held rotatable but axially immovable in bearings 9, 10. On the spindles 5, 6 there are screwed nuts 11, 12 which continue axially as sleeves 13, 14 which reach beyond the opposite free front ends of the spindles 5 and 6 even if the nut 11 or 12 is screwed on the spindle up to the proximity of the bearing 9 or 10.

On the sleeves 13, 14 reaching over the free spindle ends of the spindles 5, 6 there is fastened by both of its ends a tensioning element in the form of a steel band 15. It extends in the axial direction of the spindles 5, 6 away from them and extends around a disk 16 which is fastened on a take-off shaft 17. The take-off shaft is placed in bearings 18, 19 and carries a plate 20 whose conformal rotary setting is carried out by the setting drive.

The steel band 15 bears tightly tensioned on the disk 16 and transmits an adjusting motion by friction. If in the example no adjustment of the take-off shaft 17 greater than 180 degrees is required, a form-locking fastening of the steel band 15 can be provided additionally on the disk 16.

During operation, rotation of the motor 1 is transmitted by way of the pinion 2 with the same rotary direction to the spur wheels 3 and 4 so that the spindles 5 and 6 rotate in the same direction and with the same angular velocity. Because of the opposing spiralling of the spindles 5, 6 however, the nuts 11, 12 are shifted in opposite directions and the steel band 15 extending around the disk 16 is correspondingly taken along by the longitudinally movable parts of the spindle drives 7, 8 namely the nuts 11, 12 with sleeves 13 and 14.

The embodiments of FIGS. 3, 4 and 5, 6 illustrate how the pretensioning of the steel band can be brought about and can be maintained even in connection with a change of the length of the band (for instance, because of thermal expansion or shrinkage).

As is shown in FIG. 4, in the embodiment of FIGS. 3 and 4, the axial bearings 9, 10 of the spindles 5, 6 are arranged in a plate 21 which by way of a pressure spring 22 is supported on another plate 23. This plate is held stationary, as indicated, for instance, in a housing. Guide pins 24 fastened in the plate 21 engage slidingly in the plate 23, and serve as a protection against torsion and assure parallel shifting. Furthermore, in plate 23 there are provided bores 26 through which the spindles 5, 6 are guided with play.

Accordingly, in order to pretension the steel band 15, both spindle drives 7, 8 can move slightly in the axial direction under the pressure of the spring 22. Here the drive arrangement can be made in such a way that the motor 1 with the pinion 2 and the spur wheels 3, 4 also carries out the motion or that the drive pivots 25 of the spindles 5, 6 can be held torsion-resistant but axially movable in the spur wheels 3, 4.

In the embodiment of FIGS. 5 and 6, the equalization of the length of the steel band is achieved in a different manner. Here two partial bands 15a and 15b are provided which in opposition to one another extend at least partially around a respective disk 27, 28 and are fastened on it. These disks are arranged freely rotatable on the take-off shaft 17. An engaging piece 29 fastened on the take-off shaft 17 between the disks 27, 28 engages in circular arc-shaped recesses 33 by means of its portion 30 which also has a circular arc-shaped cross section. A pressure spring 32 acts between the portion 30 of the engaging piece and the disk 27 pertaining to the steel band 15a (more precisely: the adjacent side edge of its recess 33). A spring 31 disposed in the recess 33 of the disk 28 pertaining to the steel band 15b acts on the other side of the portion 30 of the engaging piece.

In the two last-mentioned embodiments, changes of the length of the steel band 15 (or steel bands 15a, 15b) lead to changes of the pretensioning in the springs 22 or 31, 31 but have no influence on the accuracy of the transmission of the setting value.

The spindle drives 7, 8 preferably are ball roller spindles in which no sliding and therefor no abrasive relative motion of the nuts 11, 12 takes place in relation to the spindles 5, 6. The lasting stability of the setting drive is therefore unusually high; the accuracy of the transmission of the setting values remains preserved for a very long time.

The invention is claimed as follows:

1. A setting drive for the accurate angular positioning of a shaft comprising an elongate flexible low-expansion tensioning member connected to said shaft for turning of said shaft free of slippage in response to lengthwise movement of said tensioning member, said tensioning member having a first spindle drive having a first part and a second part, means mounting said first part for turning movement but restrained against axial movement, the second part being connected to the first end of said tensioning member, said first and said second parts being drivingly connected so that turning movement of said first part moves said second part rectilinearly to move said second tensioning member in a predetermined direction lengthwise of said tensioning member, a second spindle drive similar to said first spindle drive and having similar first and second parts, the second spindle drive first part being similarly mounted and the second part being connected to said second end of said tensioning member for lengthwise movement of said tensioning member, said first spindle drive and said second spindle drive being spaced apart laterally, a motor with an output shaft having a pinion thereon, and gear means interconnecting said pinion and the respective first parts for positively synchronously rotatably driving both of said spindle first parts synchronously to move both of said second parts rectilinearly in relatively opposite directions so that both of said second parts simultaneously and synchronously move said tensioning member in a predetermined direction lengthwise of itself.

2. A setting drive as set forth in claim 1 wherein one of the first and second parts of each spindle drive comprises a threaded shaft and the other comprises a nut member thereon.

3. A setting drive as set forth in claim 1 and further including spring means acting on said tensioning member to pretension said tensioning member.

4. Setting drive for the positioning of a take-off shaft; comprising a two-part reducing spindle drive, one part of which is placed axially immovable but turnable and drivable and the other part of which engages torsion-resistant and longitudinally movable with the one part, a flexible low-expansion tensioning means having one end fastened under pretensioning on the longitudinally movable part of the spindle drive and the other end thereof being connected torsion-positive with the take-off shaft, characterized by the fact that the tensioning means extends in the axial direction of the longitudinal motion and by means of the other end is guided force-locking or form-locking around the take-off shaft and that a device is provided which pretensions drive and take-off against each other, characterized further by the fact that the pretensioning device is a second spindle drive with an advance path the same as the first spindle drive opposingly directed and acting on the take-off shaft by means of tensioning means of the same type, characterized further by the fact that a spring is arranged in such a way that it pretensions the bearings of the parts turnable and axially immovable of both spindle drives jointly in their axial direction, the two parts being placed in a plate which by way of the spring is supported on a stationary plate.

5. A setting drive for the accurate angular positioning of a shaft comprising an elongate flexible low-expansion tensioning member connected to said shaft for turning of said shaft free of slippage in response to lengthwise movement of said tensioning member, said tensioning member having first and second ends disposed remotely of said shaft, a first spindle drive having a first part and a second part, means mounting said first part for turning movement but restrained against axial movement, the second part being connected to the first end of said tensioning member, said first and said second parts being drivingly connected so that turning movement of said first part moves said second part rectilinearly to move said tensioning member in a predetermined direction lengthwise of said tensioning member, a second spindle drive similar to said first spindle drive and having similar first and second parts, the second spindle drive first part being similarly mounted and the second part bring connected to said second end of said tensioning member for lengthwise movement of said tensioning member, means for positively synchronously rotatably driving both of said spindle first parts synchronously to move both of said second parts rectilinearly in relatively opposite directions so that both of said second parts simultaneously and synchronously move said tensioning member in a predetermined direction lengthwise of itself, spring means acting on said tensioning member to pretension said tensioning member, and further comprising a fixed member, said spring means acting between said fixed member and the respective mounting means for said first parts.

6. A setting drive for the accurate angular positioning of a shaft comprising an elongate flexible low-expansion tensioning member connected to said shaft for turning of said shaft free of slippage in response to lengthwise movement of said tensioning member, said tensioning member having first and second ends disposed remotely of said shaft, a first spindle drive having a first part and a second part, means mounting said first part for turning movement but restrained against axial movement, the second part being connected to the first end of said tensioning member, said first and said second parts being drivingly connected so that turning movement of said first part moves said second part rectilinearly to move said tensioning member in a predetermined direction lengthwise of said tensioning member, a second spindle drive similar to said first spindle drive and having similar first and second parts, the second spindle drive first part being similarly mounted and the second part being connected to said second end of said tensioning member for lengthwise movement of said tensioning member, means for positively synchronously rotatably driving both of said spindle first parts synchronously to move both of said second parts rectilinearly in relatively opposite directions so that both of said second parts simultaneously and synchronously move said tensioning member in a predetermined direction lengthwise of itself, spring means acting on said tensioning member to pretension said tensioning member, wherein said tensioning member comprises two separate parts, a pair of disks respectively turnably mounted on said shaft and to which said separate parts are connected, and a base member fixed on said shaft, said spring means acting between said base member and said disks.

7. A setting device as set forth in claim 6 wherein each of said disks has recesses therein and said base member extends into said recesses, said spring means comprising a pair of springs respectively mounted in said recesses and acting between said part and a respective disk.

* * * * *